United States Patent [19]

Roemer, Jr.

[11] Patent Number: 4,625,450
[45] Date of Patent: Dec. 2, 1986

[54] QUICK RELEASABLE CONNECTOR FOR MULTIPLE BAIT FISHING

[76] Inventor: Leonhard J. Roemer, Jr., 27 Forgham Rd., Rochester, N.Y. 14616

[21] Appl. No.: 752,976

[22] Filed: Jul. 8, 1985

[51] Int. Cl.$^4$ .............................................. A01K 97/00
[52] U.S. Cl. .................................... 43/43.12; 43/44.91
[58] Field of Search ................. 43/42.11, 42.13, 42.23, 43/42.39, 42.46, 42.47, 42.49, 43.13, 43.1, 43.12, 44.85, 44.87, 44.88, 44.91, 44.93; 24/136 R, 136 K, 136 L

[56] References Cited

U.S. PATENT DOCUMENTS

| | | | |
|---|---|---|---|
| 2,162,821 | 6/1939 | Parmenter | 43/44.91 |
| 3,023,535 | 3/1962 | Holka et al. | 43/43.1 |
| 3,765,118 | 10/1973 | Reitler | 43/43.12 |
| 3,925,920 | 12/1975 | Walker | 43/43.12 |
| 3,960,461 | 6/1976 | Sachs | 24/136 L |
| 4,221,068 | 9/1980 | Roemer | 43/43.12 |

FOREIGN PATENT DOCUMENTS

| | | | |
|---|---|---|---|
| 1110041 | 10/1955 | France | 43/43.1 |
| 62452 | 3/1940 | Norway | 43/43.1 |

*Primary Examiner*—M. Jordan
*Attorney, Agent, or Firm*—Stonebraker, Shepard & Stephens

[57] ABSTRACT

A connector for connecting a lateral fish line (leading to a bait or lure) to a main fish line, at a fixed point on the main line until released. After release, the connector can slide along the main line, so that it does not interfere with rapid reeling in of the main line. The connector has a frusto-conical wedging shank surrounded by an axially movable clamping sleeve, the main fish line being clamped fixedly between the shank and the sleeve, while waiting for a fish to strike a lure or bait on a lateral line attached to the connector. Any number of these connectors, each with its own lateral line and lure, may be placed at intervals on the same main line. When the line is reeled in, the clamping sleeve of the first connector strikes an obstruction such as the line guide eyelet at the end of the fishing rod, and this moves the sleeve to an unclamping or released position, so the main line may move freely through the connector and the connector does not interfere with continued reeling in. The second connector then strikes the first connector, which releases the clamping sleeve of the second connector, and as reeling in continues each succeeding connector strikes the one above it and releases. This makes it practical to use multiple lures or baits on a single line, as the line can be reeled in quickly, without having to stop to untie or unfasten a connection as each lateral line connection arrives at the end of the fishing rod.

13 Claims, 9 Drawing Figures

QUICK RELEASABLE CONNECTOR FOR MULTIPLE BAIT FISHING

This invention relates to a connector for connecting an individual short lateral line (bait or hook or lure line or leader) to a main fish line, with the connection clamped at a definite predetermined point on the main line until the main line is reeled in. When the main line is reeled in, the connector automatically releases its grip on the main line and slides easily along the main line, thus permitting the reeling to continue without interruption when two or more of these connectors are used on the same main line.

This connector is useful in various kinds of fishing, including both still fishing and trolling fishing, and the trolling fishing may be either of the downrigger type or of the outrigger type.

SUMMARY OF THE INVENTION

In its preferred form, the invention comprises a shank with a tapered portion, and an internally tapered sleeve surrounding the tapered portion of the shank. The sleeve has a radial slot through which a main fishing line may be inserted into the space between the sleeve and the shank when the sleeve is loose on the shank, and then the sleeve may be moved toward the large end of the shank to clamp the main line firmly between these parts. Below the sleeve, the shank has a lug to which may be attached the lateral fish line or leader for the hook or bait or lure, and below this lug is a stationary hub with a longitudinal slot of slightly larger size than the diameter of the main fishing line, so the line will run freely through it. The hub is surrounded by a rotatable ring, frictionally held in any position of orientation in which it is set, the ring having a slot through which the main fish line may be inserted into the slot in the hub, when these two slots are aligned with each other. Then a slight rotation of the ring on the hub will serve to retain the line in the slot of the hub.

When the sleeve is clamped on the tapered shank, to hold the line tightly and immovably between them, the upper end of the sleeve projects above the upper end of the shank. Consequently, when the line is reeled in, the upper end of the sleeve will strike the guide eyelet at the end of the fishing rod, and the pressure will force the sleeve downwardly on the tapered shank, unclamping the line which will then run freely through the connector as reeling in of the line continues. A second connector clamped on the line below the first connector will come up and hit the bottom of the first connector, which will release or unclamp the second connector, and similar action will take place successively with respect to any other connectors clamped on the main line. Thus, the fisherman may fish with several lures or baited hooks attached at intervals along a single main line, and when he gets a strike, he may quickly reel the line in to retrieve the fish, each lateral line connection being automatically unclamped from the main line as the reeling continues.

BRIEF DESCRIPTION OF THE DRAWINGS

In the accompanying drawings.

DESCRIPTION OF THE PREFERRED EMBODIMENT

For the sake of clarity, FIGS. 1-7 of the drawings illustrate the connector device on an enlarged scale, that is, larger than its actual size. It comprises a shank member 11 the upper portion of which is tapered as shown at 13, to form a frusto-conical portion with its larger diameter or base at the top. A sleeve 15 surrounds the tapered shank 13, the inner surface of the sleeve being correspondingly tapered. There is a radial slot 17 at one point in the periphery of the sleeve, this slot extending through the full length of the sleeve and through the full thickness.

Figure 1:
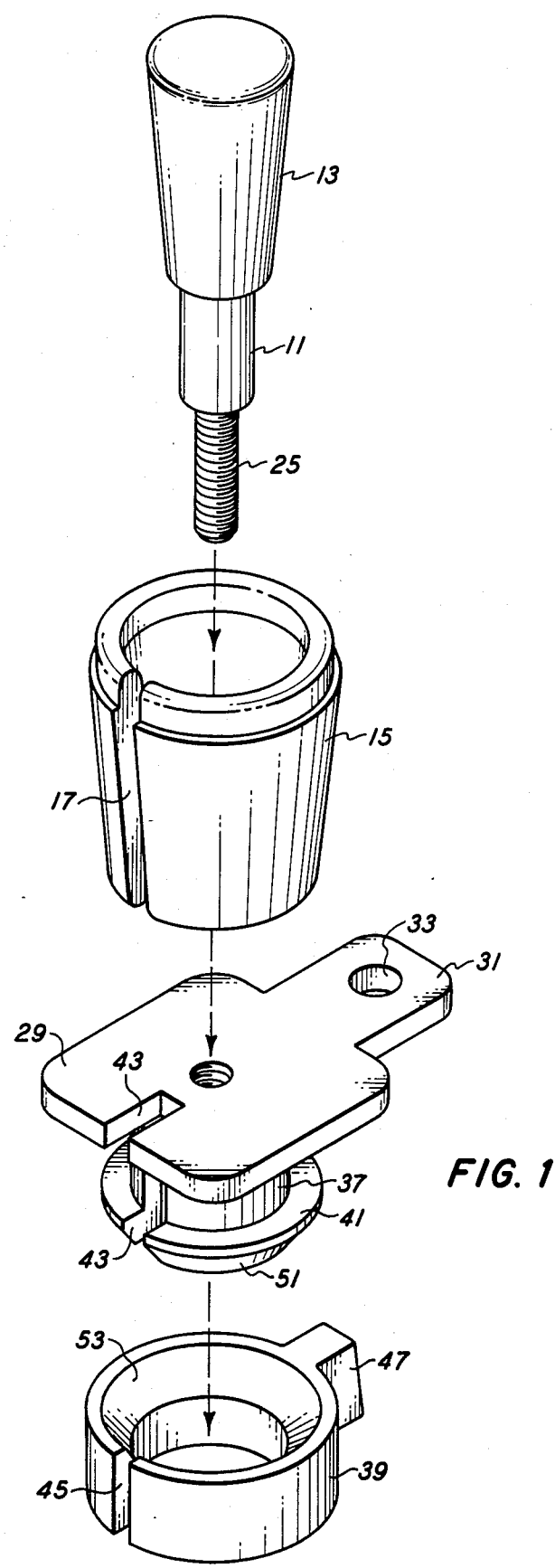
FIG. 1 is an exploded perspective view of a preferred embodiment of the connector.
Figure 3:
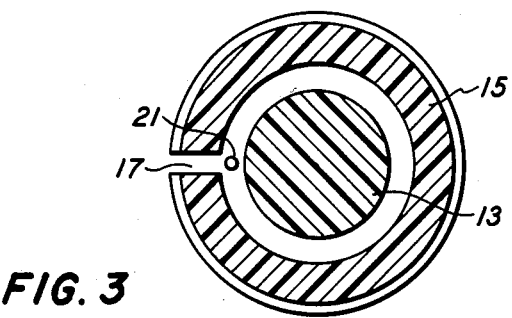
FIG. 3 is a transverse section on the line 3—3 of FIG. 2, with parts omitted.
Figure 2:
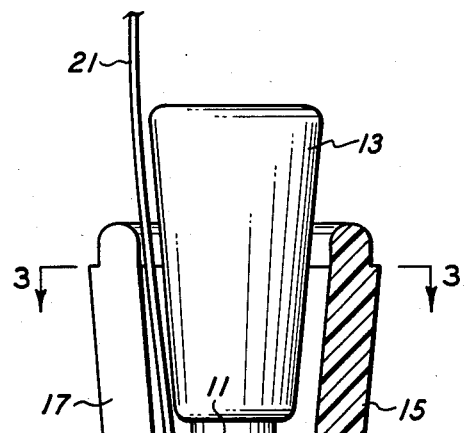
FIG. 2 is a central vertical section through the connector, with the parts in released or unclamped position.

When the sleeve is in a low position relative to the shank, as illustrated in FIG. 2, there is a space or gap between the sleeve and the tapered shank portion 13. The main fish line 21 may then be laid in the slot 17 of the sleeve, and be held manually while the sleeve is turned to a position where a solid part of the sleeve, rather than the slot, overlies the fish line. Then the sleeve is manually moved upwardly relative to the tapered shank, with sufficient force to wedge the sleeve tightly on the taper of the shank, thereby clamping the device firmly to the line 21, as in FIGS. 5 and 6.

The lower end 25 of the shank fits into and is fixed to a hub assembly indicated in general at 27. This hub assembly has a top flange 29 projecting radially at one side as at 31 to form an ear or lug which is provided with any convenient means, such as the hole 33, for attachment of a lateral fish line or leader, going to a baited hook or a lure or the like. The drawings illustrate a metal ring 35 inserted through the hole 33, merely as a typical form of conventional attaching means for the lateral fish line.

Below this top flange of the hub assembly, the assembly has a circular cylindrical section 37 on which a retaining ring 39 rotates, and a small lip or flange 41 at the bottom of the cylindrical section 37 holds the retaining ring against downward displacement.

Figure 4:
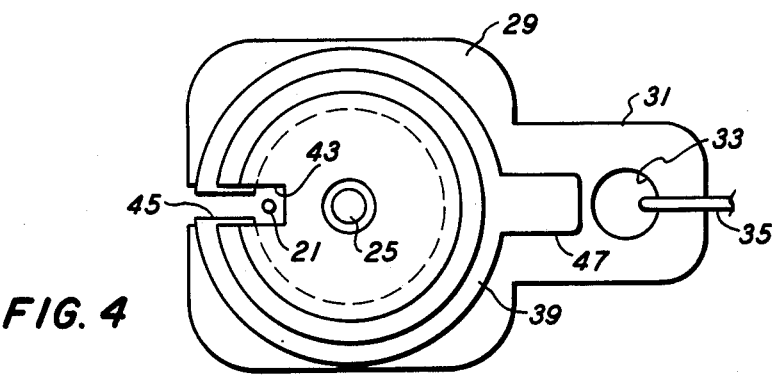
FIG. 4 is a bottom view of the device, with the parts in the same position as in FIG. 2.
Figure 6:
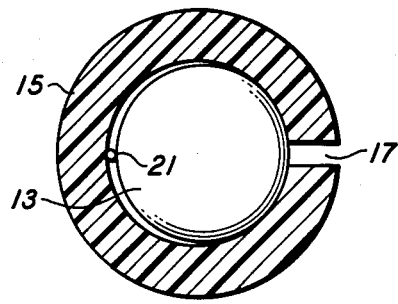
FIG. 6 is a transverse section on the line 6—6 of FIG. 5, with parts omitted.
Figure 5:
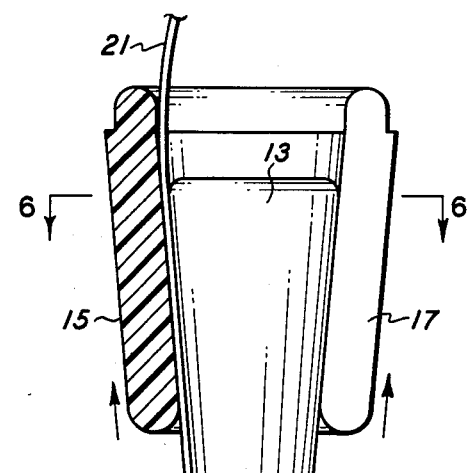
FIG. 5 is a view similar to FIG. 2, but with the parts in locked or clamped position.
Figure 7:
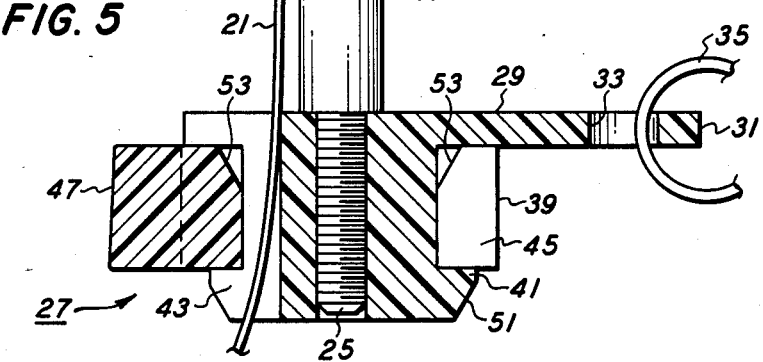
FIG. 7 is a bottom view of the connector with the parts in the position shown in FIG. 5.
Figure 7:
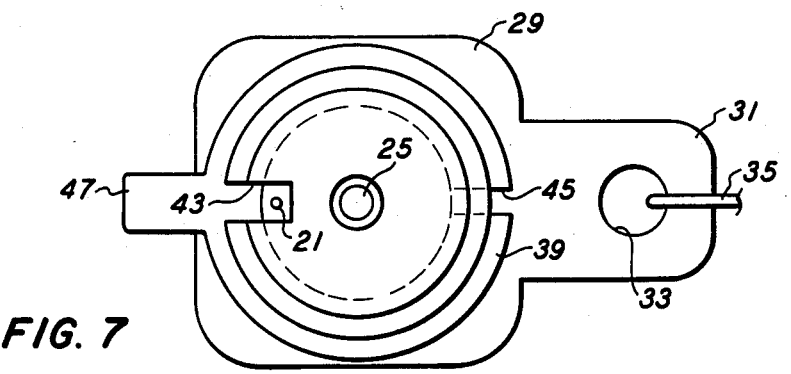

At one point on the circumference of the hub, preferably on the opposite side from the lug 31, the hub is provided with a radial slot or groove 43 extending axially through the entire height of the hub, including the top flange 29 thereof and the bottom lip 41. This slot 43 has a cross-sectional size somewhat larger than the diameter of the main fish line with which this connector is to be used, so that the line may always run freely through the slot, without binding. The above mentioned retaining ring 39 has a corresponding slot 45 extending all the way through the radial thickness of the ring, and has a manipulating lug 47 projecting a short distance radially on the side diametrically opposite to the slot 45, for convenient manual turning of the ring, which has a rather tight frictional fit on the hub. When the ring 39 is turned so that its slot 45 is aligned with the slot 43 in the hub, then the fish line 21 may be laid in the hub slot 43 (FIGS. 2 and 4). Then the ring 39 is turned (preferably but not necessarily through 180 degrees) to bring the slots out of alignment with each other, so that the retaining ring holds the fish line securely in the hub slot (FIGS. 5 and 7) and the device can not be separated or lost from the fish line, although it is free to slide along the fish line if and when the tapered clamp parts 13, 15 are released.

These various parts are preferably molded from plastic material. Polyvinyl chloride (PVC) is preferred, but other plastics known in the molding industry may be used.

The shank member 11, 13, 25 must be initially manufactured as a separate member from the hub member 29, 41 to permit the sleeve 15 to be assembled on the shank before the shank is permanently attached to the hub. The attachment of the shank to the hub may be accomplished in any desired way. For example, the lower end 25 of the shank may be provided with screw threads, as illustrated in the drawing, so that it may be screwed tightly and permanently into corresponding threads in the central bore of the hub. Alternatively, the lower end of the shank and the bore of the hub may be left smooth, with a close fit to each other, and may be secured to each other by adhesive, or by welding. Various welding processes suitable for plastics materials are well known in the plastics art. Or again, the shank and the hub may be fixed to each other by merely a very tight press fit.

The retaining ring 39 may be assembled to its final position by taking advantage of the resilience of the plastic material. To assist in expanding the retaining ring so that it will slip axially over the lip 41, the circumference of the bottom of the hub may be externally chamfered as shown at 51, and the upper end of the retaining ring 39 may be internally chamfered as shown at 53. Then when the retaining ring is thrust axially upwardly onto the hub, the chamfered surfaces will wedge against each other and cause the ring to expand (not too difficult, because the ring is split by the slot 45) and ride over the lip 41 and then contract and snap into place when the lower end surface of the ring gets to the top surface of the lip 41. After that, the ring can not be removed.

Figure 8:
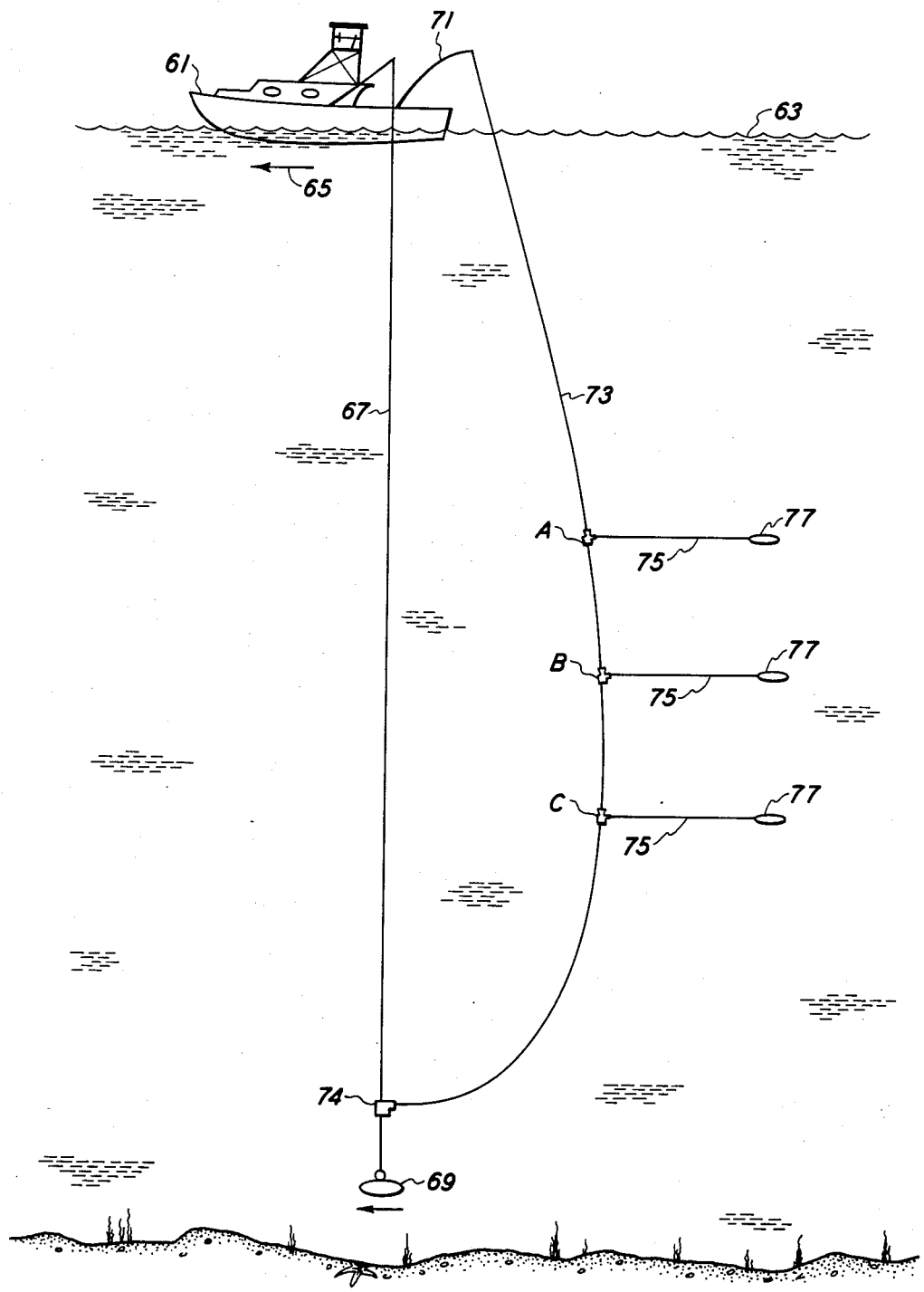
FIG. 8 is a schematic view illustrating the use of the device in downrigger fishing.

A typical use of the connectors of the present invention is to downrigger fishing, illustrated schematically in FIG. 8. A fishing boat 61 in the body of water 63 proceeds in the direction of the arrow 65, in a trolling operation. A downrigger cable 67 with a heavy weight 69 at its lower end is suspended from the boat, with the weight usually fairly close to the bottom 71, if the depth of the water is not greater than the length of the cable.

A fisherman in the boat has a rod or pole 71 equipped with the usual line 73 and reel (not shown). The lower end of the line may be attached to the downrigger cable by a suitable quick release fish line holder 74, such as the holder disclosed in the present inventor's prior U.S. Pat. No. 4,221,068, granted Sept. 9, 1980. At any desired number of points along the line 73, lateral lines or leaders are attached to the main fish line 73 by means of the connectors of the present invention. Three such connections are here illustrated as an example, designated respectively at A, B, and C, each having its own lateral line 75 (fastened to the connector at the hole 33 (FIGS. 2, 4, 5, and 7) leading to any desired bait or lure 77.

When the fisherman in charge of the pole or rod 71 senses a strike, he usually does not know which one of the various baits or lures on his line has been struck, but in any case he must reel in his line quickly to attempt to retrieve the fish that struck. As the line 73 is reeled in, the upward pull on the device 74 will release the line from the downrigger cable, in the manner described in the patent above mentioned. Then as reeling progresses, the first one A of the connectors of the present invention is brought up to the pole, hits the end of the pole or the line guide eyelet, which knocks the tapered sleeve downwardly from the clamped position of FIG. 5 to the released position of FIG. 2. Then the line 73, FIG. 8 (or 21, FIGS. 2 and 5) can slide easily through the connector device, so reeling can continue until the second connector B (FIG. 8) comes up and hits the bottom of the first connector A, which releases the second one. Third and subsequent ones are released in the same manner. It will be noted that in the clamped position, the top edge of the tapered sleeve projects well above the top of the shank, so any contact pressure of a fixed object from above will be applied to the sleeve rather than to the shank, and will force the sleeve downward to release the clamping effect.

These connectors of the present invention may be used in the same way for still fishing as distinguished from trolling. For still fishing, the line would be similar to the line 73 in FIG. 8, except that the bottom end of the line would not be attached to a downrigger cable, and the fisherman and his rod or pole might be on a stationary dock or bridge, or in a stationary boat.

Figure 9:
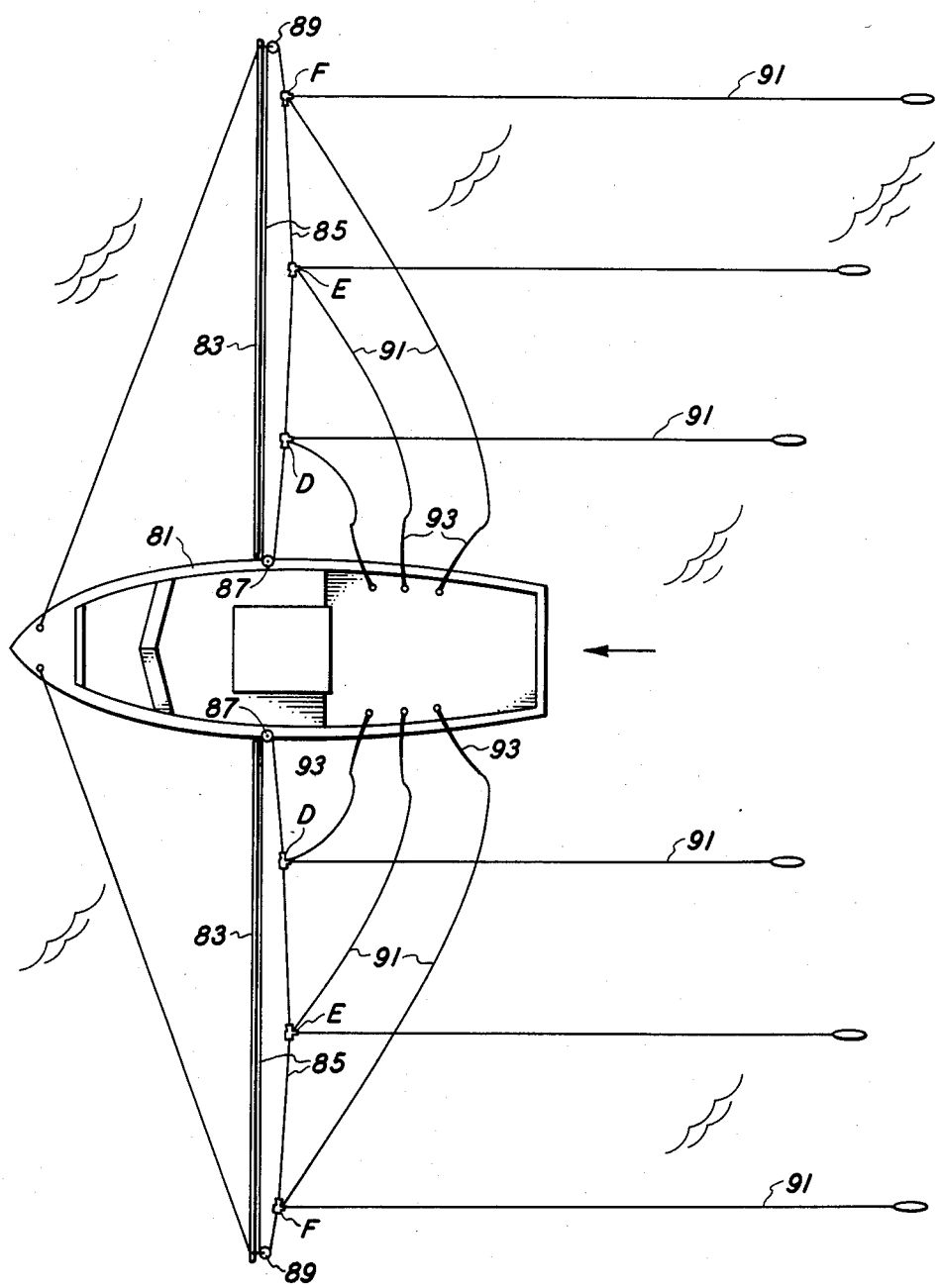
FIG. 9 is a schematic view illustrating the use of the device in outrigger fishing.

The invention is useful also in outrigger trolling, as illustrated schematically in FIG. 9. Here, the boat 81 has outrigger booms 83 which support the endless outrigger cables 85 which pass over the inboard pulleys 87 and outboard pulleys 89. The connectors of the present invention are placed at any desired intervals along the outrigger cables 85, such as at the locations D, E, and F, with the tapered sleeves of these connectors faced inwardly toward the boat, so that when the outrigger cable is moved on its pulleys to bring a connector in toward the boat, the end of the sleeve will make contact with the pulley or the gunwale of the boat or some fixed part, to move the tapered sleeve to the unclamped position. In this arrangement, it is the outrigger cable, rather than the fish line, which goes through the slots in the connector. Then a quick release device of the kind shown in the above mentioned patent is attached to the lug 29 of the connector, and the fish line 91 goes from the rod or pole 93 to the release arm 81 of the release device shown in the patent (see FIG. 2 of the patent). When it is desired to bring the tackle aboard, the endless cable 85 is actuated, and as the successive connectors clamped to the cable arrive at the inboard pulley or some other stop member near it, pressure against the tapered sleeve will move the sleeve to unclamped position so the connector can slide along the cable and the cable can continue to move, until all of the connectors have been brought in. Each successive connector will be released by hitting against the preceding one, just as in the case of reeling in a downrigger set-up.

The connector of the present invention is preferably used with monofilament fish line, but may be used with any kind of line, and any kind of cable, in those cases where the connector is mounted on a cable rather than on a fish line.

Among the advantages of the connector of the present invention, are the following:

It enables the attachment of any number of lures to one fish line, at any desired place on the line, so that lures may be placed for fishing shallow and deep simultaneously. When the line is reeled in, all lure connectors will slide to the end of the fish line.

In downrigger applications, the angler controls the action of the lures to a much greater extent than has been possible previously. When the lower end of the fish line is clamped to the downrigger cable by the release device of the prior patent mentioned, the rest of the fish line above the clamped lower end has a tendency to loop out or belly out rearwardly as the boat moves forward in the water, this rearward bellying being illustrated in FIG. 8. The extent of the rearward bellying or looping depends on the tautness of the line, so can be controlled by the angler's use of the reel. Reeling the line in a few feet causes the lures to dart forward. Reeling the line out allows the lures to flutter back. Tugging up and down on the fish line will jiggle the lures. Combinations of lures on the same fish line can be used, such as a plug and a spoon attached to different leaders from connectors at different elevations on the same fish line. Since both are on the same line in close proximity, the action of one lure will affect the other lure, causing an erratic action of one or both lures. Also, several lures which are alike can be trolled together from a single line, thus giving the appearance of a school of bait fish. This is a very desirable condition.

The control of the lures is in the hands of the fisherman, who can feel the lures working. It provides a whole new system of fishing.

What is claimed is:

1. A connector for connecting a lateral fish line to a main line, said connector comprising:
   (a) means for loosely encircling a main fish line to keep said connector connected to said main line without impeding movement of said connector along said line;
   (b) means forming an inclined wedging surface;
   (c) a clamping member movable relative to said wedging surface and cooperating therewith to clamp there between a portion of a main fish line which also passes through said encircling means;
   (d) said clamping member having a portion adapted to strike a fixed object as said main fish line is reeled in, thereby to move said clamping member in an unclamping direction relative to said wedging surface; and
   (e) means forming an attachment point for attaching a lateral fish line carrying a lure or the like.

2. The invention defined in claim 1, wherein said inclined wedge surface is a frusto-conical shank portion, and said clamping member is a clamping sleeve surrounding said frusto-conical portion and movable axially relative thereto.

3. The invention defined in claim 2, wherein said clamping sleeve has a radial slot extending completely through its radial thickness and throughout its length, of sufficient size so that said main fish line may be passed laterally through said slot and be laid between said frusto-conical portion and said sleeve while said sleeve is in a loose unclamped position.

4. The invention defined in claim 1, wherein said means encircling said main fish line is formed by a hub portion having on one side a longitudinal slot of sufficient cross-sectional size to receive said main fish line in free sliding condition, and means for retaining said line from lateral dislodgement out of said slot.

5. The invention defined in claim 4, wherein said retaining means is in the form of a split ring rotatable on said hub, said ring having a radial slot through which a portion of a main fish line may be laid in or removed from said longitudinal slot in said hub while said slot in the ring is aligned with said longitudinal slot.

6. A connector for connecting a lateral fish line to a main line, said connector comprising:
   (a) a shank part;
   (b) a hub part axially aligned with said shank part in fixed relation thereto;
   (c) said shank part having a frusto-conical section with diameter decreasing in a direction toward said hub part;
   (d) an internally tapered sleeve surrounding said shank part and movable axially thereon between a released position closer to said hub part and a clamping position farther from said hub part;
   (e) said sleeve having a longitudinal slot extending throughout the length of said sleeve and through the full wall thickness thereof, said slot being of sufficient width so that a main fish line may be inserted laterally through said slot to place it in a position between said sleeve and said frusto-conical section of said shank part, to be clamped in such position upon movement of said sleeve in a direction away from said hub part;
   (f) said hub part having a longitudinal slot of sufficient cross-sectional dimensions to receive said main fish line loosely for longitudinal movement in said slot;
   (g) retaining means on said hub part for holding said main fish line in said longitudinal slot of said hub part; and
   (h) means forming an attachment point for attaching to said hub part a lateral fish line connected to a lure or the like;
   (i) whereby the connector may be clamped at any desired location on a main fish line by clamping action between said sleeve and said frusto-conical section, and may be released to move freely along said main line by moving said sleeve to its said released position, while said connector still remains attached to said main line;
   (j) so that any desired number of such connectors may be applied to the same main fish line, to permit any desired number of lures to be used simultaneously from a single main fish line while allowing the line to be reeled in quickly by moving the sleeve of each successive connector from clamping position to released position as each successive connector reaches a predetermined position during reeling in.

7. The invention defined in claim 6, wherein said sleeve in its clamped position projects beyond the end of said shank part which is remote from said hub part, so that during reeling in of a main line to which said connector is clamped, forcible contact with an obstruction will exert pressure on said sleeve to move said sleeve from its clamping position toward its released position.

8. The invention defined in claim 6, wherein said hub part includes a cylindrical portion, and wherein said retaining means on said hub part is in the form of a split ring rotatable on said cylindrical portion, said ring serving to retain a line against lateral escape from said longitudinal slot in said hub part except when the split in the ring is aligned with the slot.

9. The invention defined in claim 8, wherein said split ring has a lateral projection for ease of manually rotating said ring on said hub part.

10. The invention defined in claim 6, wherein said means forming an attachment point is a radial lug projecting laterally from said hub part.

11. The invention defined in claim 10, wherein said radial lug is on a side of said hub part which is opposite the location of said longitudinal slot in said hub part.

12. The invention defined in claim 6, wherein said shank part, hub part, and sleeve are formed of plastic material.

13. The invention defined in claim 6, wherein said shank part, hub part, and sleeve are formed of polyvinyl chloride.

* * * * *